Inventor
J. V. Atanasoff

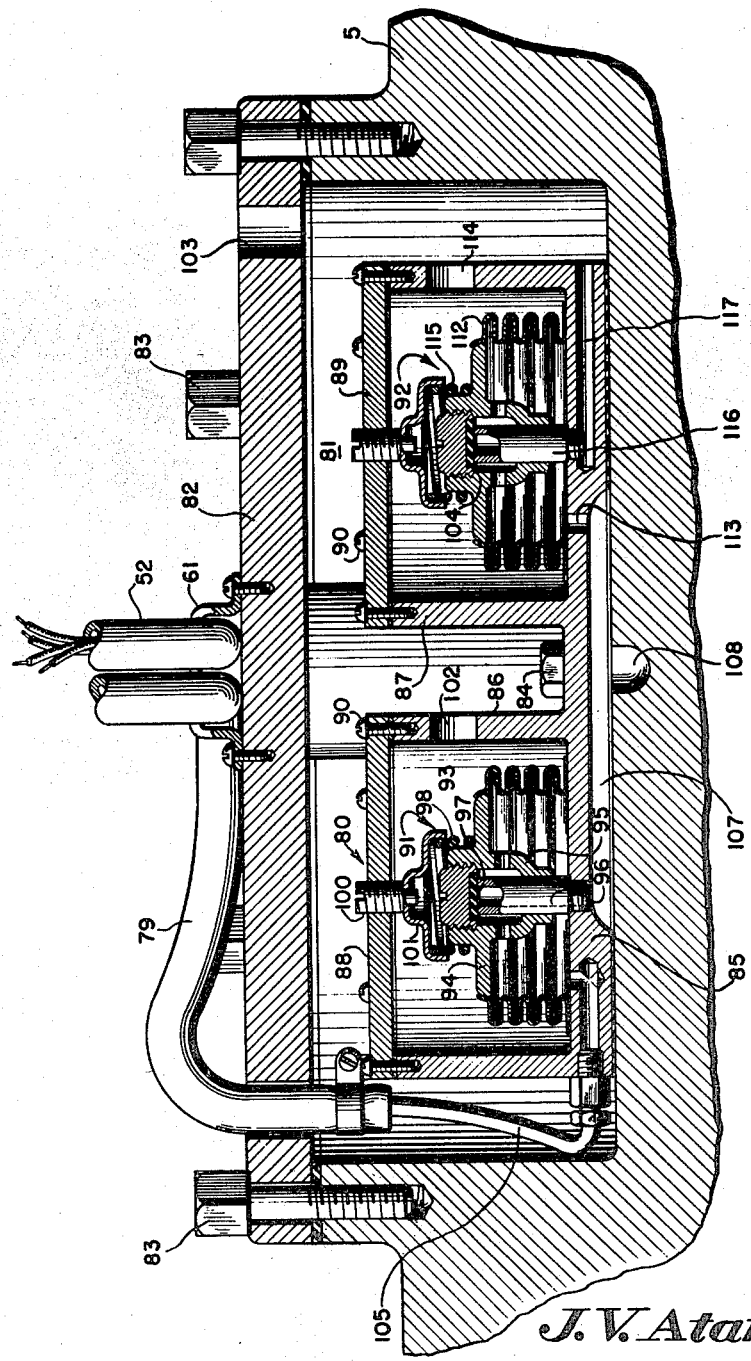

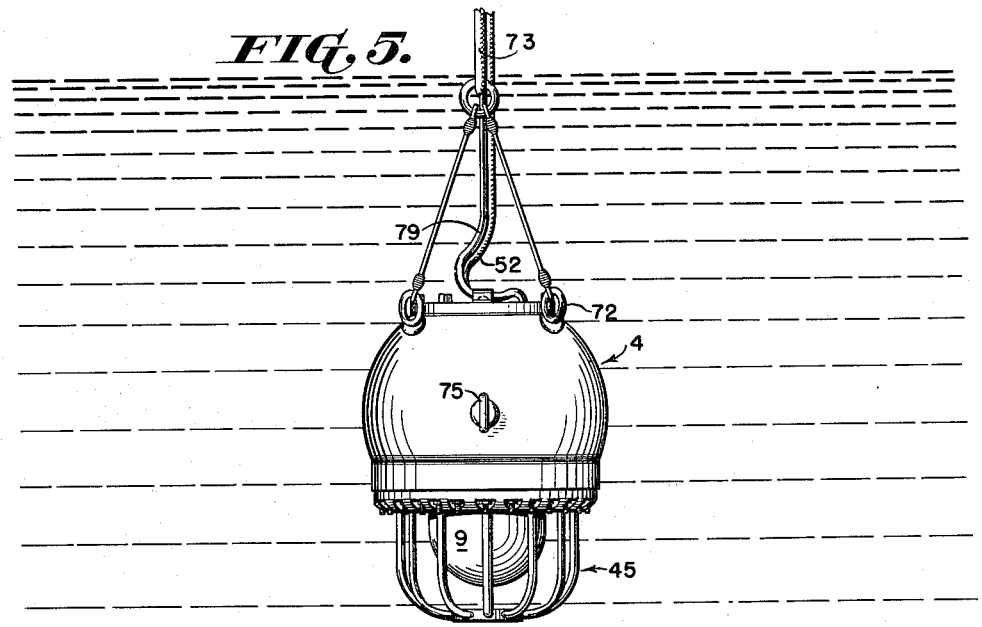

2,961,639
Patented Nov. 22, 1960

2,961,639

UNDERWATER TRANSDUCER

John V. Atanasoff, Hyattsville, Md.

Filed May 8, 1947, Ser. No. 746,842

8 Claims. (Cl. 340—14)

(Granted under Title 35, U.S. Code (1952), sec. 266)

This invention relates to signaling apparatus and more particularly to a submarine transducer or projector adapted to convert electrical impulses into acoustic signals of a controlled frequency and intensity.

The development of acoustic mines of the type adapted to be fired by the underwater acoustical disturbance emitted from a vessel passing thereover has brought about the need for artificially testing the acoustic response of such mines at the time of assembly thereof by subjecting them to a sequence of controlled sound signals having frequencies of the character and intensity similar to that set up within a body of water by reason of a vessel passing therethrough.

The testing of such mines by subjecting them to actual ship runs has proven not only costly but highly unreliable by reason of the numerous uncontrollable factors that enter into the conditions of such a test.

It is an object of the present invention to provide a new and improved transducer adapted to convert signals comprising impulses of electrical current into mechanical energy in the form of an acoustic wave transmission without loss of high frequency components of the signals and of an intensity to penetrate a predetermined distance through water for actuating acoustic responsive devices such, for example, as the firing mechanism of an acoustic mine.

Another object is to provide a new and improved underwater signaling device adapted to radiate or project signal wave energy of a known magnitude into the surrounding water and from which the signal wave pressure may be accurately integrated from specific positions within the wave field for hydrophone calibration or for actuating other forms of acoustic responsive devices.

A further object is to provide a new and improved underwater electromechanical transducer of the type incorporating a coil driven diaphragm adapted to transmit electrical impulses into the surrounding liquid medium in the form of pressure waves responsive to the electrical impulses received by the coil carried thereby without losing the high frequency components of said impulses.

A still further object of the invention is to provide a submarine signaling device of the coil driven diaphragm type having a hydrostatically controlled gaseous pressure system whereby pressure applied to the surface of the diaphragm from the surrounding fluid medium substantially compensated for by gaseous pressure opposedly applied to the enclosed side thereof.

Another object of the invention is to provide a submarine signaling device having as a part thereof, an electromagnetically driven diaphragm against which the hydrostatic pressure against the exposed side thereof is substantially compensated or balanced by gaseous pressure applied to the enclosed side thereof by increasing or decreasing the pressure, as the case may be, applied to the enclosed surface of the diaphragm in proportion to a change in hydrostatic pressure applied to the exposed side thereof.

It is a further object to provide an electromechanical transducer of the aforedescribed type having means for preventing loss of high frequency components of the signals converted thereby.

An additional object resides in the provision of an electro acoustic transducer of a type having a dome-shaped piston and means for avoiding a hydrodynamic sink for high frequency sound in the vicinity of the moving piston thereby to prevent loss of high frequency components in the signals converted by the transducer.

Another object of this invention resides in a submarine type sound translating device having an electromechanical system that is both efficient in operation and capable of withstanding high underwater pressures.

Additional objects, features, and advantages of the present invention are those residing in and relating to the novel construction and arrangement of the elements thereof, as will more clearly appear from the following description reference being made to the accompanying drawings.

Fig. 4 is an enlarged fragmentary sectional view of the pressure control bellows assembly; and Fig. 5 is a view in elevation of the device suspended within a body of water in a position suitable for actuating an acoustic mine for test purposes.

Figure 1:
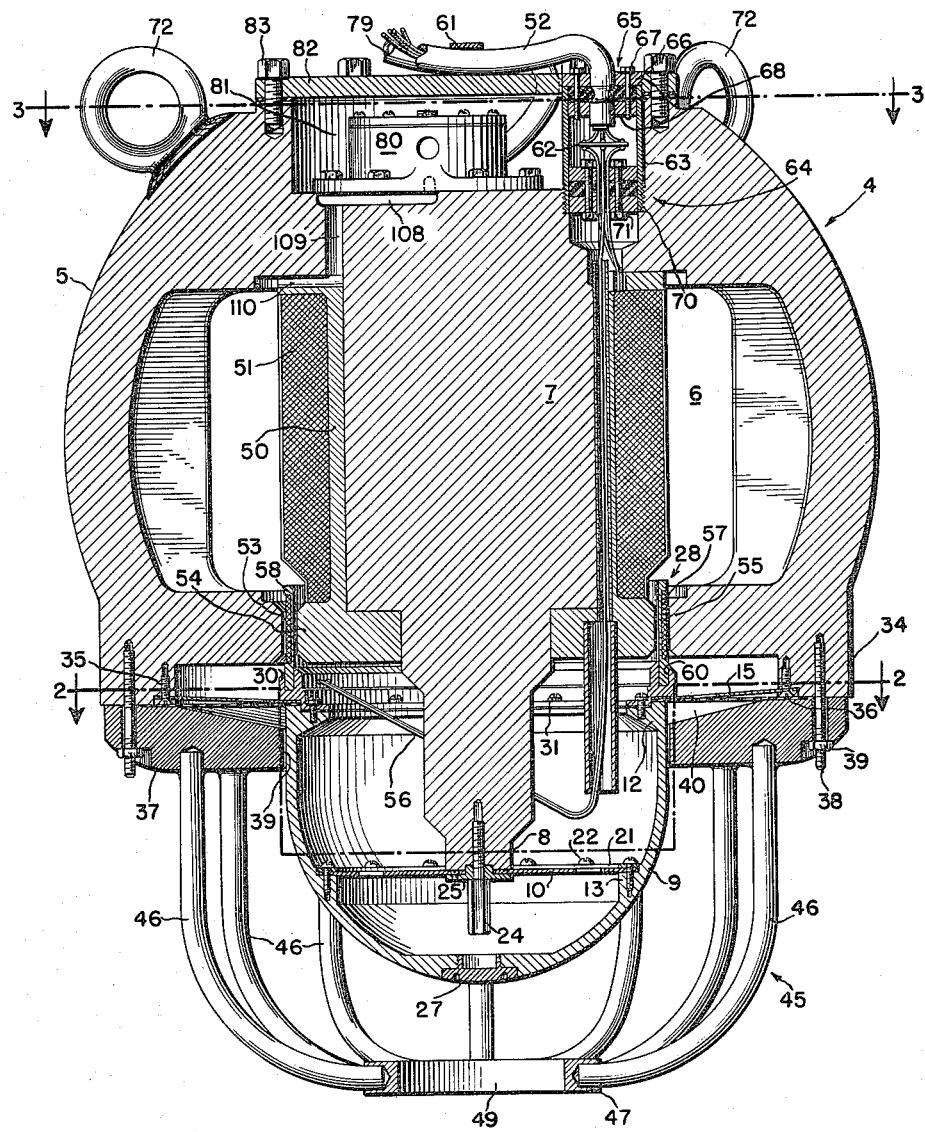
Fig. 1 is a view in section and partly in elevation of a preferred embodiment of the invention.

Fig. 1 illustrates a sound transducer or projector 4 constructed according to the preferred embodiment of the invention and in which the casing or body 5 thereof is formed as a somewhat spherical casting of material having high magnetic permeability such, for example, as steel or one of the various alloys thereof having similar characteristics. Centrally arranged within the cavity 6 and formed preferably as an integral part of the casting, is the shaft or core piece 7 having as a part thereof a reduced portion 8 adapted to extend outwardly from the casting for supporting the hollow piston or rigid diaphragm member 9 suitably connected therewith by the flexible spider member 10.

The piston is preferably formed of light metallic material such, for example, as aluminum or duralumin and hemispherical in shape with a suitable wall thickness such, for example, as ¼ inch. The annular bosses 12 and 13 within the piston are preferably formed as an integral part thereof and arranged for connecting therewith other elements of the device such, for example, as the piston supporting spiders 10 and 15 respectively. A further function of these annular bosses or rings is to add stiffness to the piston structure, thereby to reduce distortion and warping which could otherwise effect the frequency response of the device.

Figure 2:
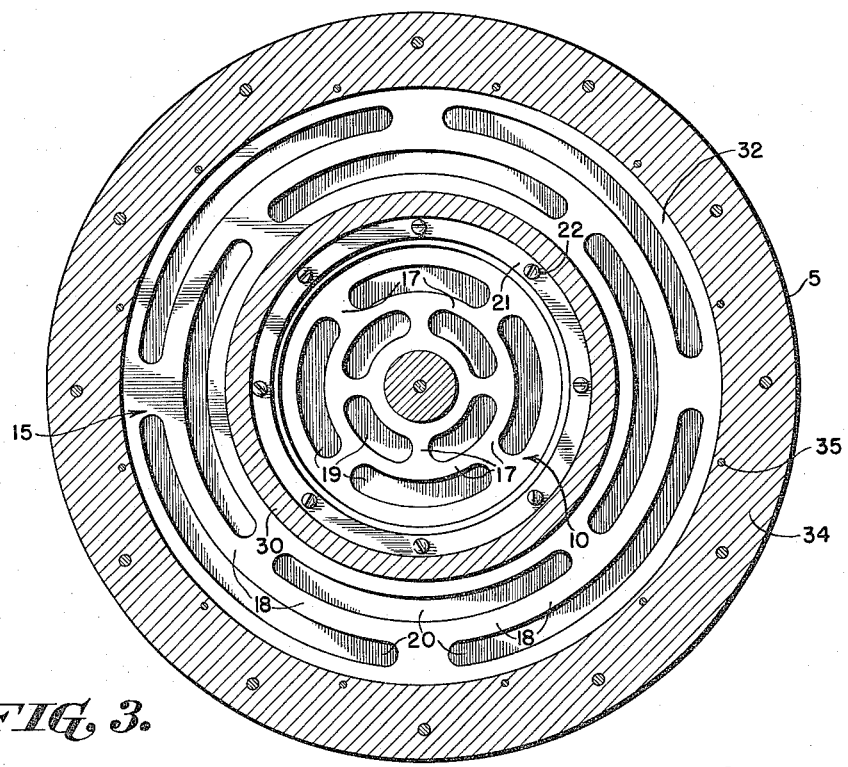
Fig. 2 is a sectional view taken along line 2—2.
Figure 3:
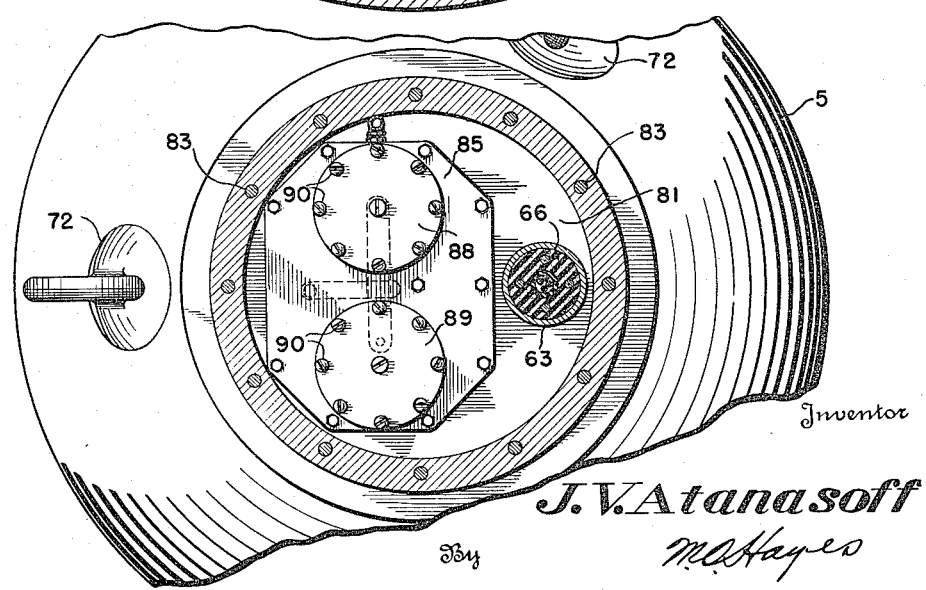
Fig. 3 is a sectional view of the device of Fig. 1 taken along the line 3—3 thereof.

The spiders 10 and 15 are each formed from any suitable resilient material such, for example, as sheet plastic or Phosphor bronze, each spider being cut as illustrated in Fig. 2 to include a plurality of flexible members 17 and 18 respectively formed by cutting from the body of the spiders segments corresponding to openings 19 and 20 respectively. The spider 10 is clamped to boss 13 by the ring washer 21, being drawn thereagainst upon tightening screws 22 circumferentially arranged about the spider and in threaded engagement with the boss. Spider 10 supports the piston concentrically of the supporting pole piece 8 to which it is secured by bolt and washer 24 and 25 respectively. Access to this bolt, for assembling or dismantling the device, is obtained by removing the threadedly connected plug member 27 from the closed end of the piston. The reason for the elongated head of the bolt 24 is to provide a stop for limiting the inward movement of the piston responsive to an excessive external pressure applied to the outer surface thereof.

The piston is further concentrically stabilized by the second and larger spider 15 which is secured to the open end thereof at the time of fastening thereto the voice coil ring assembly generally designated 28. The voice coil ring assembly includes a ring 30 having a flange portion through which screws 31 are inserted for threaded engagement with the annular boss 12 of the piston. The annular rim portion 32 of spider 15 is adapted to be secured to flange 34 of the casing by screws 35.

By reason of the resilient character of spiders 10 and 15, the piston is movable freely in a direction parallel with the axis of the projector but substantially incapable of movement transversely thereto.

To prevent moisture entering the projector a thin flexible diaphragm 36 is arranged over the outer surface of the spider 15, the diaphragm being adapted to connect the piston with the casing in such a manner as to provide a watertight partition for separating the cavity 6 within the casing from the outer surface thereof without substantially increasing the resistance to movement of the piston along the axis of the projector. It is understood that the diaphragm may be secured in any suitable manner, the method illustrated provides that the diaphragm be clamped to the piston simultaneously with spider 15 and to the casing by the guard ring 37 which is secured to the casing by stud bolts and nuts 38 and 39 respectively.

If the relatively soft air supported surface, as presented to the water by the resilient diaphragm 36 is left unprotected, there is a tendency for water, displaced by the outer portion of the moving piston, to flow directly toward this easily displaced diaphragm, thereby introducing an effective hydrodynamic sink in the immediate vicinity of the piston. To avoid this effect, the guard ring 37 is machined on its inner edge 39 to a diameter slightly larger than the outer periphery of the piston, thereby to operate as a baffle or shield to protect the diaphragm from this acoustic pressure imparted to the water by the movement of the piston. The guard ring 37 is relieved at 40 to allow free movement of the diaphragm and spider 15 associated therewith during the operation of the device.

Preferably welded to the guard ring 37 is the cage structure generally designated 45 including a plurality of bar members 46 bent inwardly to connect with diametrically arranged recesses 47 formed in the connecting ring member 49 to which the bars are secured preferably by welding. It is the object of the cage to protect from damage the extending head of the piston and further, by reason of its structure, to add stiffness and rigidity to the transducer and thereby reduce body vibration and resonance that might otherwise be set up therein.

Arranged over the core 7 is a sleeve or spool 50 upon which is wound a coil 51 adapted when energized, by current supplied through cable 52, to magnetize the core and casing in a manner to set up a flux path across the air-gap 53 formed by reason of the adjacency of the pole pieces 54 and 55 comprising annular flanges on sleeve 50 and casing 5 respectively.

Movable within the air-gap 53 and responsive to impulses of current received thereby through leads 56, is the voice or piston driving coil 57 which is wound about the preferably plastic ring 58. Ring 58 is secured to ring 30 of the voice coil assembly in any suitable manner, preferably by press-fitting within the annular groove 60 formed therein. The pole faces adjacent the voice coil are so formed as to allow the extremities of the coil 57 to normally lie outside the area in which the magnetic flux is highly concentrated whereby the flux distribution within the gap ranges from a maximum value at a position approximately $\frac{3}{32}$ inch within the pole faces to approximately 40% of maximum $\frac{1}{4}$ inch therefrom. Such an arrangement leaves an approximately average of 91% of the ideal or optimum value effecting the coil when displaced $\frac{3}{16}$ inch in either direction from center position whereby distortion of the output wave due to nonuniformity of interaction between the voice coil and magnetic field is negligible for all frequencies above the lowest contemplated in the signals to be transduced by the projector.

To reduce high impedance as might be set up within the pole pieces by reason of the voice coil current, the faces of the pole pieces 54 and 55 respectively are coated with a material high in electrical conductivity such, for example, as copper plated thereon to a thickness of .07 inch which is operative, by reason of the current induced therein, to shield the body of the pole pieces from the magnetic effect of the voice coil current.

If too large an inductance is set up by reason of the field coil current as might cause damage to switches and insulation, a rectifier may be connected in parallel with the field coil so as to oppose the flow of current therethrough.

The necessary current for operating the device is supplied through the four conductor cable 52 that is secured to the transducer by being clamped thereto by the U-shaped bracket 61. The terminals of the cable 52 connect with the respective leads of coils 51 and 57 respectively at the terminal plate 62 arranged within the tubular receptacle 63 between sealing assemblies 64 and 65. The receptacle 63 is threaded at the lower end for connection with the body of the casing in the manner shown and with the free end thereof suitably closed about the cable by the sealing assembly 65 which includes a resilient washer 66 adapted to expand outwardly against the wall of the receptacle and inwardly about the cable when compressed between washers 68 by bolts 67.

The second seal 64, provided about the leads of the coils, is constructed in substantially the same manner as seal 65 except that in this case both washers are movable inwardly against the resilient sealing washer 70 by tightening bolts 71, the resilient washer 70 being operative when compressed to expand inwardly about the leads and outwardly for engaging the side walls of the receptacle 63.

Arranged about the outer surface of the casing and preferably welded thereto are eyepads 72 by which the transducer may be lowered by cable 73 into the water and suspended with its axis vertical. With the alternate use of eyepad 75, Fig. 5, the projector may be suspended from cable 73 with its axis horizontal.

When the projector is lowered to a position some distance below the surface of the water, the hydrostatic pressure thereagainst is sufficient, if uncompensated, to force the diaphragm or piston 9 thereof inwardly to a position against the limiting stop or bolt head 24 to thereby render the projector inoperative. To avoid this condition, gas under pressure is supplied from a source above the surface of the water by way of the supply tube 79 to the space 6 within the transducer or speaker 4 thereby to maintain a pressure against the enclosed side of diaphragm 9 equal or slightly above the pressure applied to the exposed side thereof from the surrounding water. This equalizing of the pressure against the diaphragm leaves it free to respond to the urge of the voice coil 57 connected therewith.

The gaseous pressure within the projector is controlled by a pressure responsive valve assembly generally designated 80 and arranged within a tail well 81 provided in the base of the casing and suitably closed by the protecting plate 82 secured thereover by bolts 83. Positioned within the well and adapted to be fastened to the bottom surface thereof by screws 84 is a plate 85, Fig. 4, having arranged thereon and preferably furnace-brazed thereto, a pair of cylinders 86 and 87. The cylinders are closed by cover members 88 and 89 respectively and secured thereto by screws 90. Arranged within the respective cylinders are the pressure responsive valve assemblies 91 and 92, the assembly 91 thereof being operative to admit gas to the interior of the transducer as supplied from the surface of the water through tube 79. Included in the valve assembly 91 is the expandable member or bellows 93, the lower end of which is secured to the mounting plate 85 in any suitable manner, preferably by brazing. Fastened preferably in the same manner to the free end of the bellows 93 is a guide member 94 having a depending portion 95 thereon for slideably connecting with a tubular valve stem 96 to operate as a guide for accurately positioning the valve seat 97, formed of resilient material such, for example, as neoprene over the mouth of the stem, thereby to control the flow of gas therethrough. A predetermined valve closing pressure is applied to the bellows by spring 98 yieldably bearing thereagainst and adjustably controlled by the loading structure including the set screw and washer 100 and 101 respectively.

The openings 102 and 103 provided through the walls of the cylinder and cover plate 86 and 82 respectively, allows the entrance of the surrounding water to the outer surface of bellows 93, thereby to normally maintain the bellows, with the assistance of loading spring 98, in a compressed or valve closing position.

As gas under pressure is forced into the system through the supply tube 79 and into bellows 93 through the tubular connection 105, the bellows 93 expands to lift from the mouth of stem 96 the valve seat 97, thereby to allow gas to flow out of the bellows through the slotted passageway 107 provided in base plate 85, and thence through the orifice 108, notch 109, and groove 110 in spool 50 into cavity 6 of the speaker. In the speaker cavity, the gas flows through the air gap 53 to the inner surfaces of the piston 9 and diaphragm 36 thereby to drive the piston outwardly against the hydrostatic pressure applied to the outer surface thereof by the surrounding water.

A predetermined pressure differential is maintained within the speaker with respect to the surrounding water pressure by means of the exhaust valve assembly 92 that is operative to exhaust gas from the speaker in excess of that necessary to maintain this pressure differential. The valve assembly 92 is substantially the same construction as valve assembly 91 except that the pressure within bellows 112 is maintained by gas discharged from the bellows 93 and cavity 6. When the pressure internally of the transducer is greater than the pressure externally thereof bellows 112 is operative to expand against the pressure of the surrounding water applied against the outer surface thereof through the entrance port 114 to lift seat 115 and discharged the gas through valve stem 116 and thence through port 117 into the surrounding water by way of port 103. The initial loading of the bellows 112 by spring 104 determines the pressure differential to be maintained during submersion of the speaker. For example, two pounds applied by spring 115 against the surface of the bellows results in a two-pound greater pressure within the speaker than that applied to the outer surface thereof from the surrounding water.

Should a break occur in the gas supply line 79 the pressure within the bellows 93 will immediately drop to that of the hydrostatic pressure applied to the outer surface thereof. The resulting static pressure condition allows spring 98 to urge the bellows to a valve closing position and thereby prevent water entering the system through the break in the line.

While the invention has been described with reference to the preferred embodiment thereof which gives satisfactory results, it is to be understood by those skilled in the art to which the invention pertains, after understanding the invention, that various changes and modifications may be made therein without departing from the spirit and scope of the invention, and it is intended therefor, in the appending claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. An underwater acoustic device including a casing having an opening therein, a hollow dome-shaped piston including a cylindrical wall section resiliently connected to said casing and movable through said opening, a flexible diaphragm connecting the periphery of said piston with the casing in a manner to prevent flow of water therein through said opening, a guard ring arranged about the outer surface of said diaphragm and connected along the outer edge thereof to the wall of said casing, the inner edge of said ring being arranged in close adjacency to said cylindrical wall section of said piston for maintaining the clearance therebetween constant during movement of said piston thereby to prevent a rapid flow of water to the diaphragm as the piston is driven, electromagnetic means for driving said piston, means for maintaining a gaseous pressure against the inner surface of said piston including a supply line leading from a source of gas pressure above the surface of the water, a valve interposed between said source and the inner surface of said piston, pressure responsive means for controlling operation of said valve, means forming a gas venting circuit, an exhaust valve interposed in said venting circuit, and pressure responsive means for opening said exhaust valve thereby to vent said gas from the casing when the pressure therein exceeds the pressure of the surrounding water by a predetermined value.

2. An underwater acoustic signalling device including a casing having an opening therein, a guard ring mounted on said casing in alignment with said opening, a dome-shaped piston including a cylindrical section resiliently mounted within said opening with the cylindrical section thereof extending outwardly from the casing through said guard ring and in close adjacency with respect thereto whereby loss of high frequency acoustic signals is prevented as the piston is driven in response to electrical signals corresponding thereto, a rigid cage structure arranged about the extending head of the piston and rigidly secured to said ring to protect the piston and reduce vibration of the device due to mechanical resonance, an annular flexible diaphragm connecting the periphery of said piston with the casing at the opening thereof to prevent water entering the casing therethrough, a magnetic structure including an air-gap, a coil within said casing for setting up a magnetic field in said gap, means including a second coil movable in said gap for driving said piston to produce acoustic signals in response to electrical signals having different frequency components, and means for maintaining a gaseous pressure against the inner side of said piston substantially equal to the water pressure against the outer side thereof.

3. In an underwater transducer of the character disclosed, a pressure equalizing system including a gas filling duct, in communication with the interior of the transducer and with a gas supply line connected thereto, a valve arranged in said duct for controlling the flow of gas therethrough, pressure operated means including an expansible member connected to said duct for causing said valve to open in response to a predetermined pressure of gas applied thereto thereby to admit gas to the interior of said transducer, a gas venting system including a venting duct in communication with the interior of said transducer and with the surrounding water, an exhaust valve connected in said venting duct, a pressure responsive member operatively connected to the exhaust valve and adapted to respond to a predetermined pressure applied thereto thereby to operate said valve and maintain the gas within the transducer at a predetermined pressure.

4. A device as claimed in claim 3 in which the first said valve is operative in response to a rupture in the supply line to close said filling duct thereby to prevent water entering the system therethrough, 5. In an underwater transducer of the character disclosed, a pressure equalizing system including a gas filling duct in communication with the interior of the transducer and with a gas supply line connected thereto, a valve arranged in said duct for controlling the flow of gas therethrough and adapted to be closed in the event that the supply line is ruptured, pressure operated means including an expansible member for causing said valve to open in response to a predetermined pressure of gas applied thereto and thereby admit gas to the interior of said transducer, a gas venting system including a venting duct in communication with the interior of said transducer and with the surrounding water, an exhaust valve in said venting duct, a pressure responsive member operatively connected to the exhaust valve and adapted to respond to a predetermined pressure applied thereto thereby to operate said valve and maintain the gas in the transducer at a predetermined pressure.

6. An underwater electro-acoustic signalling device including a casing having an opening through one end thereof, a dome-shaped piston having a cylindrical outer wall section and resiliently mounted for movement within said opening, a flexible diaphragm connecting said piston to the casing adjacent said opening thereby to prevent the entrance of water into the casing, a guard ring member arranged over the outer surface of said diaphragm and connected to the casing, the inner edge of said ring member being arranged in close adjacency to said cylindrical wall section of said piston whereby the clearance therebetween is maintained constant during movement of said piston, a rigid cage like structure arranged in spaced relation about the outer surface of said piston and secured at intervals to said guard ring thereby to protect the piston and prevent vibration of the ring as acoustic signals are produced by the device in response to electrical signals applied thereto, a magnetic structure arranged in said casing and including an air gap, electroresponsive means for setting up a magnetic flux across said gap, means including a coil movable within said gap for causing said piston to vibrate and thereby produce said acoustic signals in response to changes in a current signal flowing through the coil, and means including a gas filling duct in communication with the interior of said casing for maintaining a gaseous pressure within the casing in substantial equality to the pressure of the surrounding water.

7. An underwater transducer of the character disclosed comprising in combination a structure of magnetizable material including a hollow integral casing having an annular opening therein, a core piece forming an integral part of said casing and extending centrally outwardly therefrom through said opening, a spool of magnetic material sleeved over said core and having thereon an extending flange section for forming therebetween and said casing an annular air gap, a coil for magnetizing said magnetic structure and arranged about said spool for providing, when energized, a flow of magnetic flux across said gap, a second coil movable within said gap in response to an alternating current applied thereto from a source above the surface of the water, a dome-shaped piston having a cylindrical wall section fixedly connected to said second coil for being driven thereby to produce an acoustic pressure signal within the surrounding water, a flexible member connecting the concave surface of said piston in adjacency to the closed end thereof with the end of said core piece, a second flexible member connected in near adjacency to the open end of said piston and to said casing for cooperating with the first said flexible member to constrain the movement of said piston coaxially of said core whereby said second coil is maintained centrally of said gap, a flexible diaphragm connecting the periphery of said piston with the casing in a manner to prevent flow of water therein through said opening, and an annular guard ring arranged about the outer surface of said diaphragm and connected along the outer edge thereof to the wall of said casing with the inner edge of said ring being arranged in close adjacency to the cylindrical wall of said piston whereby the clearance therebetween and said piston is maintained constant as the piston is driven.

8. An underwater transducer of the character disclosed comprising in combination a structure of magnetizable material including a hollow integral casing having an annular opening therein, a core piece forming an integral part of said casing and extending centrally outwardly therefrom through said opening, a spool of magnetic material sleeved over said core and having thereon an extending flange section for forming therebetween and said casing an annular air gap, a coil for magnetizing said magnetic structure and arranged about said spool for providing, when energized, a flow of magnetic flux across said gap, a second coil movable within said gap in response to an alternating current applied thereto from a source above the surface of the water, a dome-shaped piston having a cylindrical wall section fixedly connected to said second coil for being driven thereby to produce an acoustic pressure signal within the surrounding water, a flexible member connecting the concave surface of said piston in adjacency to the closed end thereof with the end of said core piece, a second flexible member connected in near adjacency to the open end of said piston and to said casing for cooperating with the first said flexible member to constrain the movement of said piston coaxially of said core whereby said second coil is maintained centrally of said gap, a flexible diaphragm connecting the periphery of said piston with the casing in a manner to prevent flow of water therein through said opening, an annular guard ring arranged abjout the outer surface of said diaphragm and connected along the outer edge thereof to the wall of said casing with the inner edge of said ring being arranged in close adjacency to the cylindrical wall of said piston whereby the clearance therebetween and said piston is maintained constant as the piston is driven, a rigid cage-like structure arranged in spaced relation about the outer surface of said piston and secured at intervals to said guard ring thereby to protect the piston and prevent vibration of the ring as acoustic signals are produced by the driven piston, means for maintaining a gaseous pressure against the inner surface of said piston including a supply line leading from a source of gas pressure above the surface of the water, a valve interposed between said source and the inner surface of said piston, pressure responsive means for controlling operation of said valve, means forming a gas venting circuit, an exhaust valve interposed in said venting circuit, and pressure responsive means for opening said exhaust valve thereby to vent said gas from the casing when the pressure therein exceeds the pressure of the surrounding water by a predetermined value.

References Cited in the file of this patent

UNITED STATES PATENTS

| | | |
|---|---|---|
| 2,404,784 | Bostwick | July 30, 1946 |
| 2,411,865 | Bostwick et al. | Dec. 3, 1946 |
| 2,429,104 | Olson | Oct. 14, 1947 |